INVENTOR
NORMAN F. BROWN
ATTORNEY

INVENTOR
NORMAN F. BROWN

BY

ATTORNEY

INVENTOR
NORMAN F. BROWN
ATTORNEY

United States Patent Office 3,479,006
Patented Nov. 18, 1969

3,479,006
BALANCED ROTARY VALVE
Norman F. Brown, Dallas, Tex., assignor to Halliburton
Company, Duncan, Okla., a corporation of Delaware
Filed Nov. 12, 1964, Ser. No. 410,523
Int. Cl. F16k 25/02, 5/04, 5/18
U.S. Cl. 251—174                                18 Claims

ABSTRACT OF THE DISCLOSURE

A rotary plug valve having tapered bearing and seal insert members normally biased into sealing engagement with the housing and plug for sealing between the plug and the housing, and having a pressure area balance ring connected with said tapered sealing and bearing insert members controlling or counter-balancing the effect of fluid pressure in the housing of the valve to reduce the wedging force of the tapered insert members with the plug and housing, so providing for low torque turning operation of the valve plug.

---

This invention relates to flow control devices for controlling the flow of fluid through a conduit. More specifically, this invention relates to plug type valves.

Plug type valves which utilize tapered insert bearings, such as a tapered insert fitting in a tapered bore in a valve body around a cylindrical plug, often are not readily incorporatable in systems where the valves are to be actuated by automatic means. The initial torque required to operate such valves, when there is a pressure differential across them, often is high and affected by the pressure conditions within the valve. Also since the force exerted on the insert bearing pushing the bearing into the tapered bore is often dependent on adjustment of external controls the valves are readily susceptible to over-tightening to the point where the automatic valve actuating means are unable to operate the valves.

Generally when a plug valve having a tapered insert bearing is subjected to a pressure differential such as when the valve is closed or partially closed, the plug and insert are displaced by the pressure toward the outlet passageway such that there is sealing engagement between the insert and the valve body around the outlet passageway. With the plug and insert so displaced the entire tapered bore of the valve body around the plug and insert is exposed to the higher pressure of the inlet side of the valve, with the exception, of course, of that portion of the insert which is sealed off around the outlet from the tapered bore. All of the forces resulting from the inlet pressure acting on the insert bearing will tend to cancel each other out in that they are acting on both the upwardly and downwardly facing surfaces except, of course, those forces acting on the surfaces which are around the lines of sealing engagement between the valve body, the valve plug, and the insert around the outlet passageway or port through the insert. At this particular location, due to the taper or conical shape of the insert bearing, the surfaces of the large end of the insert bearing exposed to the higher pressure and urging the bearing into the tapered bore of the valve body exceed in area the surfaces of the bearing between the tapered bore wall and the valve plug at the small end or inward end of the bearing which is also subjected to the higher pressure. While the pressure induced forces on the inlet side act within the inlet port of the bearing to balance the forces on the bearing since inlet pressure is within the inlet port and around the bearing, such is not the case on the outlet side where, though the inlet higher pressure is around the bearing the low outlet pressure is acting on the surfaces within the outlet port allowing the higher pressure acting on the larger outward surface due to the taper to push the bearing into the tapered bore. The net result is that on the outlet side the bearing is forced into the tapered bore of the valve body while substantially balanced forces are acting at the other points around the insert bearing. This uneven pressure responsive force on the insert bearing when a pressure differential is being exerted across the valve therefore results in increased torque required to rotate the valve when the valve is closed or partially closed.

It is an object of this invention to provide a new and improved valve.

It is another object of this invention to provide a plug type valve.

It is a further object of this invention to provide a valve having a cylindrical plug type valve element.

It is also an object of this invention to provide a plug type valve which utilizes a tapered insert bearing which permits operation under low torque conditions.

It is a most important object of this invention to provide a plug valve having a tapered insert bearing with pressure responsive apparatus which counteracts uneven forces imposed on the insert bearing because of its tapered shape when the valve is subjected to a pressure differential.

It is another important object of this invention to provide in a plug type valve employing a tapered insert bearing a mechanism for exerting a force on the tapered insert bearing which is substantially equal and opposite in direction to the force resulting from the higher inlet pressure acting on the larger surfaces facing away from the tapered bore and tending to unevenly force the insert bearing into the tapered bore on the outlet side of the bearing causing high initial torques to be needed for turning the valve when a pressure differential is imposed across the valve.

It is an additional object of this invention to provide in a plug type valve a tapered insert bearing which has a self adjusting feature responsive to the pressure within the conduit in which the valve is used.

It is a most important object of this invention to provide a plug type valve having self-adjusting features, the characteristics of which may be established at the time of construction so that the valve may be operated over an extended period without further adjustment thereby permitting it to be used in certain automatic systems and in remote locations such as in ocean bottom installations.

It is a still further object of this invention to provide in a plug type valve having a tapered insert bearing a balance ring operatively associated with the insert bearing for automatically correlating the thrust on the bearing into the tapered bore in accordance with the line pressure.

It is a further object of this invention to provide a plug type valve having a tapered insert bearing wherein a balance ring operatively associated with the bearing is used to control or counteract the thrust on the bearing into the tapered bore in response and proportion to the line pressure.

It is an important object of this invention to provide a preadjusted plug type valve which may be used with automatic opening and/or closing mechanism to provide reliable valve operation due to the valve's ability to operate under substantially uniform torque conditions without interim adjustments being made.

It is a further object of this invention to provide a plug type valve using a tapered insert bearing in which the constant thrust into the tapered bore imposed on the insert by spring force may be readily varied at the time of construction by addition or removal of springs.

It is a further object of this invention to provide a plug type valve using a tapered insert bearing on which the thrust on the bearing into the tapered bore may be varied by a combination of hydrostatic and spring generated forces.

It is a still further object of this invention to provide tapered inserts for a plug type valve wherein the inserts are formed of substantially corrosion resistant, low friction, material.

It is an additional significant object of this invention to provide a plug type valve for use in automatic systems wherein system failures may result from inadvertent over tightening of adjustable features of the valve normally used.

Additional objects and advantages of the invention will be readily apparent from the reading of the following description of a device constructed in accordance with the invention, and reference to the accompanying drawings thereof, wherein:

Referring to the drawings, the valve of the invention generally comprises a valve body 10, a cylindrical plug 11 positioned through a tapered insert bearing assembly 12, and a balance ring 13 operatively engaged with the insert bearing. The balance ring is provided with an inward thrust into the tapered bore by the spring 14 which is retained in position by a cap 15 serving the additional function of securing the valve plug within the body.

The valve body 10 is provided with an inlet passageway 20 which is internally threaded at 21 for engagement of an inlet conduit and an outlet passageway 22 threaded at 23 to permit the securing of an outlet conduit. The principal operating elements of the valve are enclosed within the centrally located tapered bore 24 formed within the body. The slope of the wall of the tapered bore 24 conforms with the slope of the insert bearing 12. An upper bore 25 having an axis substantially transverse to the axis of the passageways 20 and 22 extends through the valve body into the cavity 24 to receive one of the trunnions of the valve element. Extending into the bottom of the bore 24 through the valve body is a lower bore 30 which is internally threaded at 31 to permit engagement of the cap 15 within the body. The bore 30 has an axis which is coincident with the axes of the bores 24 and 25. The bore 30 is substantially larger than the bore 25 to allow insertion and withdrawal of the internal operating elements of the valve including the plug and the insert bearing assembly. The valve body 10 is provided at the outward end of the bore 30 with an annular recess 32 for an external seal ring. Formed within the body around the bore 30 is a second annular recess 33 which is connected with the passageway 22 by a flow passage 34. An annular recess 35 is formed within the body around the bore 25 to hold an upper external seal. Extending through the body 10 into the upper end of the bore 24 is an internally threaded bore 40 in which is engaged a grease fitting 41 used for the injection of grease into the main cavity of the valve body. A lug 42 is formed on the upper end of the valve body for engagement of conventional tools to actuate the valve.

Figure 3:
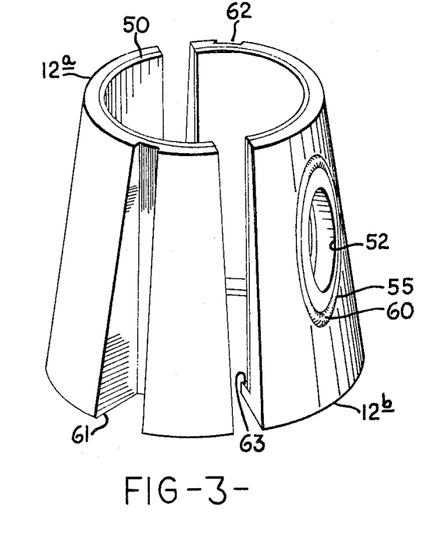
FIGURE 3 is an exploded view in perspective of the insert bearing used in the valve.
Figure 4:
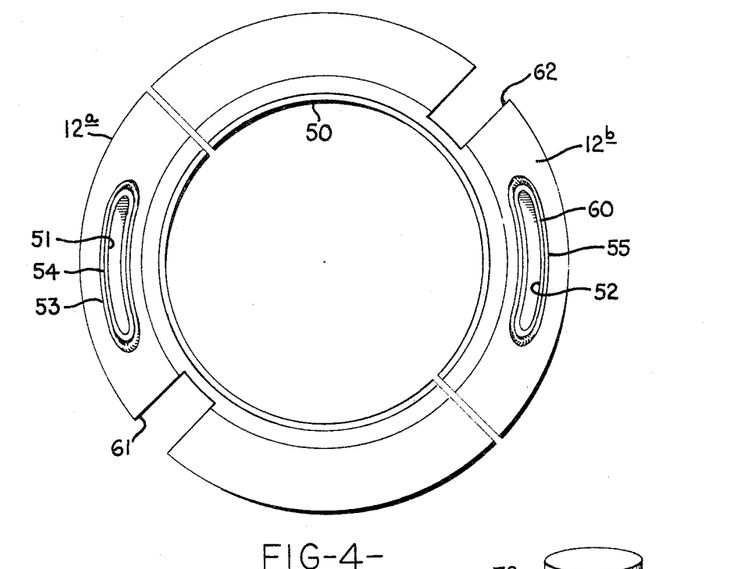
FIGURE 4 is a top view in elevation of the insert bearing illustrated in FIGURE 3.

The tapered insert bearing comprises two half-sections 12a and 12b as best seen in FIGURES 3 and 4. The taper of the external surface of the insert bearing conforms with the taper of the bore 24 in the valve body. The inner bore 50 of the insert bearing is cylindrical to accommodate the plug element 11. Passageways 51 and 52 are formed through the insert bearing to coincide with the passageways 20 and 22 in the valve body, respectively, when the insert bearing is positioned within the body. A circular groove 53 is formed along the outer surface of the section 12a of the insert bearing around passageway 51 to accommodate the seal ring 54 which effects a sealing relationship between the surface of the bore 24 and the insert bearing around the passageway. A similar circular groove 55 is formed in the outer surface of the insert bearing portion 12b around the passageway 52 to hold the seal ring 60 for establishing a sealing relationship with the surface of the bore 24 around the passageway. A slot 61 extends longitudinally down the outer surface of the insert bearing portion 12a while a similar slot 62 extends along the outer surface of the portion 12b of the insert bearing. Pins (not shown) secured to the body extend into the bore 24 into the slots 61 and 62 to restrain the insert bearing from rotation within the body. An internal annular flange 63 is formed within the lower end of the bore of each section of the insert bearing to operatively engage the insert bearing with the balance ring 13 as will be explained hereinafter.

Figure 2:
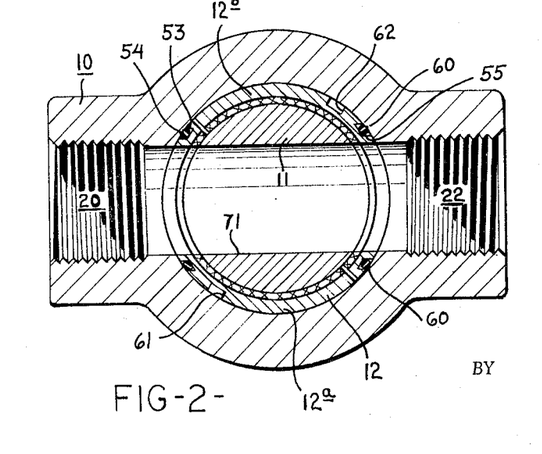
FIGURE 2 is a sectional view taken along line 2—2 of FIGURE 1.

As may be seen in FIGURE 2, the edges of the sections 12a and 12b of the insert bearing are joined at an angle of about 45 degrees with respect to the axis of the passageways 20 and 22 so that the passageway in the plug may be rotated within the insert bearing at least about 90 degrees counter-clockwise without the passageway of the plug crossing the edges of the two sections of the insert bearing.

The insert bearing is provided with an inner liner 64 which is bonded to the inside of the bore 50. The liner is, of course, split longitudinally to conform to the sections 12a and 12b of the bearing and is made of a plastic material having a low coefficient of friction and good corrosion and abrasion resistant properties. A material well suited for the liner is polytetrafluoroethylene or other fluorocarbon resins preferably reinforced as by the inclusion of glass fibers, asbestos, quartz, mica, ceramic fibers, bronze, copper, molybdenum disulfide and other metals capable of withstanding the temperatures encountered under service conditions. In the preferred embodiment the insert bearing is formed of steel with the inner liner 64 comprising a graphite filled "Teflon."

Figure 1:
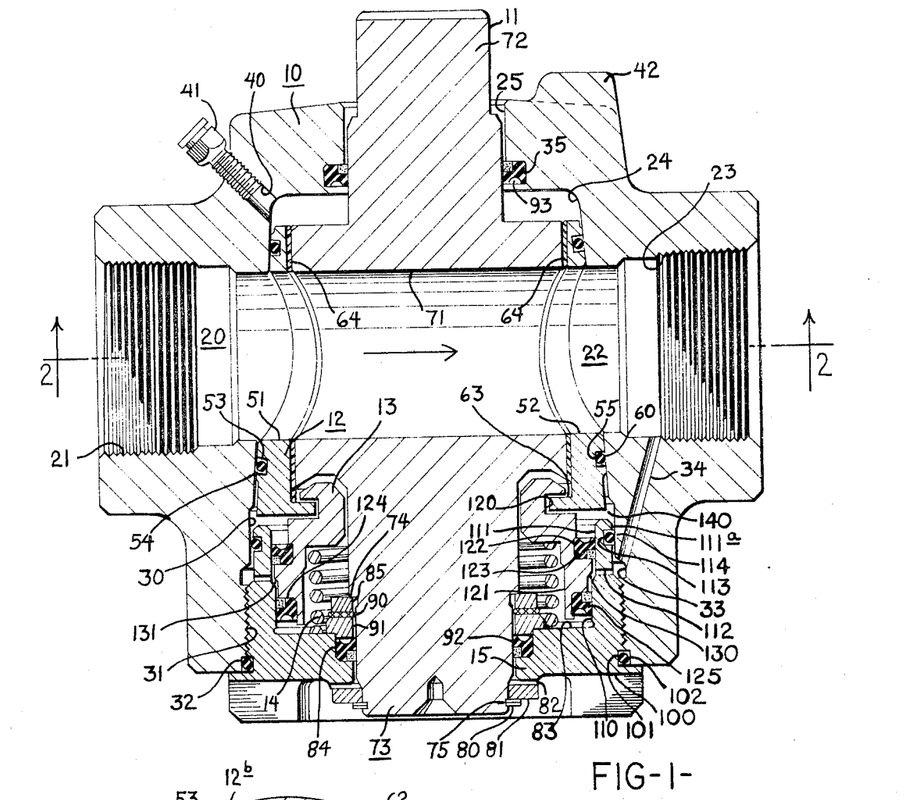
FIGURE 1 is a vertical view in cross-section of a valve constructed in accordance with the invention, the valve being shown in opened position.
Figure 5:
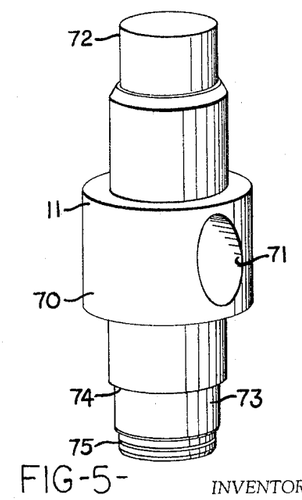
FIGURE 5 is a perspective view of the plug element used in the valve.

The valve plug 11 is rotably secured within the valve body. As illustrated in FIGURES 1, 2 and 5 the valve plug includes a central cylindrical portion 70 through which a flow passage 71 extends to cooperate with the passageways 51 and 52 in the bearing and seal insert for controlling flow through the valve. Formed integral with the central portion of the valve plug is an upper trunnion 72 and a lower trunnion 73. The outward portion of the trunnion 73 is reduced in diameter to provide an annular shoulder 74. An annular locking ring recess 75 is formed around thel ower trunnion near its outer end. A retaining rig 80 is engaged in the locking recess 75. The outer thrust ring 81 and the thrust washer 82 are confined between the outward end of the cap 15 and the retaining ring 80. The cap 15 near its bottom or outward end is provided with an internal annular shoulder 83 and a packing ring groove 84. Between the annular shoulder 83 and the shoulder 74 on the lower trunnion are an inner thrust ring 85, a thrust washer 90 and a thrust back-up ring 91. The locking ring 80, the outer thrust ring 81, the thrust washer 82, together with the inner thrust ring 85, the thrust washer 90 and the thrust back-up ring 91 cooperate with the cap 15 to lock the valve plug within the valve body. A seal assembly 92 within the recess 84 forms a seal between the lower trunnion and the cap. The seal 93 within the recess 35 forms a seal between the valve body and the upper trunnion.

The cap 15 has formed around its outer end an outwardly extending flange 100 adjacent to a groove 101 in which is positioned a seal 102 which forms an external seal between the cap and the valve body. The inward portion of the cap 15 has a graduated bore providing an outer balance ring seal seat 110 and an inner balance ring seal seat 111 within the rim 111α. As illustrated in FIGURE 1, the seat 111 is larger in diameter than the seat 110. A plurality of radial passageways 112 extend through the rim of the cap around the base of the seat 111. The passageways 112 are positioned around the cap to allow fluid within the annular recess 33 of the valve body to flow through the cap at the lower end of the seat portion 111. An annular recess 113 is formed around the rim of the cap near its inward end to accommodate a seal ring 114 for establishing a sealing relationship between the rim and the wall of the bore 30 in the valve body.

The balance ring 13 is engaged with the flange 63 within the lower end of the insert bearing. An annular groove 120 is formed around the inward end of the balance ring to permit engagement of the flange 63 with the balance ring. A bore 121 is formed within the balance ring to accommodate the spring 14 which is confined between the balance ring and the shoulder 83 in the cap 15 to bits the balance ring and consequently the insert bearing in an inward direction into the tapered bore.

An inner annular recess 122 is formed around the balance ring to accommodate the inner balance ring seal 123. An outer annular recess 124 is formed around the outer portion of the balance ring to accommodate the outer balance ring seal 125. Between the bottom of the recess 122 and the top of the recess 124 the outer side wall of the balance ring is tapered downwardly and inwardly to provide a downwardly sloping annular face 130 which is exposed to the pressure on the downstream side of the valve through the passageway 34 and annular recess 33. The difference between the maximum and minimum diameters of the balance ring along the surface 130 is substantially the same as the difference in the external diameters of the ring seals 123 and 125. The tolerance between the face 130 and the inner surfaces of the cap opposite the face is sufficient to provide an annular space 131 extending around the balance ring between the balance ring and the cap. The annular recess 131 is in direct communication with the downstream side of the valve by way of the annular recess 33, the radial ports 112 and the fluid passageway 34. The upper outer portion of the balance ring has an outer diameter substantially less than the diameter of the seat 11 above the upper balance ring seal defining an annular space 140 which extends around the balance ring below the lower end of the insert bearing 12. Actually, the annular space 140 is defined by the lower end of the insert bearing, the outer side wall of a portion of the balance ring, the upper face of the inner balance ring seal 123, the inward end of the rim 111α, and a small portion of the wall of the bore 30. As will be explained hereinatfer, the pressures within the annular spaces 131 and 140 acting on various surfaces, including the balance ring and the insert bearing, control the balance of the insert bearing and thus comprise the automatic adjusting feature of the valve.

The balance ring is the mechanism employed to apply a force to the insert bearing in opposition to the uneven force resulting from a pressure differential across the valve when closed or partially closed. When a pressure differential is imposed across the valve, the plug and the insert bearing are forced to the right or toward the outlet passageway 22 so that sealing engagement occurs between the insert bearing and the tapered bore 24 along a line substantially coincident with the center line of the seal ring 60 around the outlet passageway. Sealing will occur between the insert bearing and the plug around the outlet port in the bearing along substantially the same line. Since the plug and insert bearing are being displaced away from the inlet passageway toward the outlet passageway, leakage will genrerally occur at the inlet side of the insert bearing around the seal ring 54 resulting in the entire plug and insert bearing within the tapered bore being subjected to the higher pressure from the inlet passageway. Looking specifically at the insert bearing itself, it will be obvious that due to its tapered shape those surfaces of the bearing below the passageways, since it is the larger end of the bearing, exceed the surfaces above the passageways and thus the downwardly or outwardly facing surfaces which are subjected to the higher inlet pressure exceed the inwardly or upwardly facing surfaces also subjected to such pressure with the force being imposed on the larger surfaces due to the taper tending to push the insert bearing into the tapered bore. This tendency is, however, offset on the inlet side of the insert bearing by the same higher inlet pressure being imposed on the insert bearing within the inlet port 51 resulting in a balance of forces on the insert bearing on the inlet side since the pressure is pressing down on the larger surfaces on the lower portion of the inlet port to offset the forces from the pressure pushing in an upward direction on the larger lower end of the bearing on that side. On the outlet side of the bearing, however, the condition is different in that the seal around the outlet port in the bearing permits those surfaces within the sealed area in the outlet passageway to be exposed only to the lower outlet pressure with the result that the higher forces on the lower end of the bearing on that side, due to the taper o fthe bearing, are not balanced by the pressure within the outlet port of the bearing. This unbalance causes the torque required to turn the valve to be higher when the valve is exposed to a pressure differential. The balance ring, when constructed as hereinafter discussed, provides a counteracting force or a force in an opposite direction to offset this unbalance of forces being exerted on the insert bearing due to the lower pressure in the outlet side and due to the taper of the bearing.

In the embodiments of the valve illustrated herein, the balance ring assembly, which includes the balance ring and the balance ring seals, is so designed that the combination of the balance ring and the insert bearing which is operatively associated with the balance ring are subjected to balanced upward and downward forces from conduit pressure irrespective of the fluid pressure within passages 20, 22 and 71 of the valve. With such a state of balance of the insert bearing being maintained throughout the operation of the valve, the only net force actually biasing the insert bearing into the tapered bore 24 of the valve body is the force exerted by the spring 14. Neutralization of any biasing of the insert bearing is achieved by making the areas of the various valve elements involved a proper size to keep the desired state of balanced forces constant as the pressure changes in the line in which the valve is installed. One of the primary objectives of the provision of the balance ring in the valve is to provide a valve which may be operated by employment of low torque irrespective of the position of the valve and of the line pressure. By balancing the valve in accordance with the invention it is unnecessary in order for the valve to operate under high line pressures that a constant large force be imposed on the insert to bias it into the tapered bore. Manual adjustment of the valve is therefore eliminated.

The desired state of balance in the valve is obtained in the following manner. The annular space 131 is designed so that a vertical projection of the space is equal in area to the area of the ellipse formed by the center line of the seal ring 60 when such a center line is projected into a plane perpendicular to the axis of the insert bearing. The projection forming the ellipse might also be called a vertical projection. The view of the insert bearing illustrated in FIGURE 4 is taken along such a plane. It will therefore be seen that the cross-sectional area of the annulus 131 is sized so that it will be substantially equal to the area of the ellipse formed by the center line of the seal ring 60 as illustrated in FIGURE 4. As a practical matter, the area of concern is the area between the external diameter of the outer balance ring seal 125 and the external diameter of the inner balance ring seal 123. The axis of both the inner and outer balance ring seals coincide with the axis of the valve plug 11. Therefore, the projection of the external diameter of each of the seals into a plane perpendicular to the axis of the valve plug will provide concentric circles defining an annular area which is the difference in the diameters of the inner and outer balance ring seals. This annular area is, therefore, so designed that it will equate the area of the ellipse formed by the center line of the seal ring 60 as illustrated in FIGURE 4. It is this area on the balance ring assembly over which the pressure in the space 131 exerts a vertical force. This area which is established as substantially equivalent to the area of the ellipse formed by the center line of the seal ring 60 may be defined in other terms with respect to the elements of the valve. Reference to FIGURE 1 shows that the outer surface of the inner balance ring seal 123 fits in sealing relationship with the seat 111 of the cap 15. Also, the outer balance ring seal 125 has an outer diameter which fits in sealing relationship with the seat 110 of the cap. Therefore, the annular area to be adjusted substantially equal to the elliptical area may be stated as the difference between the diameters of the seats 110 and 111 when such diameters are concentric in a plane perpendicular to the axis of the cap.

It may be considered that the upper surfaces of the balance ring assembly exposed to line pressure are first surfaces tending to urge the ring downwardly responsive to high pressure in the valve. It may further be considered that the balance ring assembly has downwardly facing surfaces called second surfaces which are exposed to high pressure tending to urge the ring in an upward direction. Further, the surfaces of the balance ring bounding the annulus 131 may be considered as third surfaces exposed to the low pressure in the outlet side of the valve. Of course, it is to be understand that it is the vertical projection of these surfaces which is of actual concern as it is the vertical force resulting from the pressures on the balance ring assembly which biases it up and down. Therefore, another way of relating the various surfaces functioning to balance the bearing is to state that the vertical projection of the first surfaces exceed the vertical projection of the second surfaces in area by an amount equal to the vertical projection of the third surfaces and the vertical projection of the third surfaces are equal in area to the elliptical area.

One method of assembling the various components of the valve is as follows. The seal 93 is placed within the recess 35 in the valve body. The seals 123 and 125 are placed within the recesses 122 and 124, respectively, around the balance ring. The balance ring is then placed around the lower trunnion 73 on the valve plug. The two halves of the insert bearing are then assembled together around the plug with the flange 63 within the lower end of the bearing engaging the annular recess 120 around the upper portion of the balance ring. The seal ring 60 is placed in the circular groove 55 and the seal ring 54 is similarly placed in the circular groove 53 on the insert bearing. The combination of the insert bearing, the valve plug, and the balance ring are then introduced into the valve body by first inserting the trunnion 11 through the lower bore 30 of the body and carefully moving the assembly through the bore and cavity 24 until the valve plug is so positioned that the insert bearing is resting within the cavity 24 with the trunnion 72 extending through the upper bore 25 of the valve body with the seal 93 being engaged around the upper trunnion. The plug and insert bearing are manipulated by rotating them until the insert bearing is properly positioned, as illustrated in FIGURE 2, so that the pins, not shown, used to prevent rotation of the insert bearing in the body may be inserted through the body into the grooves 61 and 62 on the two halves of the bearing. The pins may be already in the body, in which case the insert bearing is placed in position so that the pins fit into the grooves. The inner thrust ring 85, the thrust washer 90, and the thrust backup ring 91 are placed around the lower trunnion of the valve plug with the forward face of the inner thrust ring in contact with the shoulder 74 on the trunnion. The spring 14 is then placed around the lower trunnion into the bore 121 of the balance ring. The seals 102 and 114 are placed in the recesses 101 and 113, respectively, around the cap 15. The seal 92 is placed within the recess 84 in the cap. The cap is then screwed into the bore 30 of the valve body until the flange 100 on the cap abuts the lower end of the valve body, as illustrated in FIGURE 1. The thrust washer 82 and the outer thrust ring 81 are placed around the lower trunnion into contact with the outward end of the cap. The locking ring 80 is engaged in the recess 75 in the lower trunnion effecting the securing together of the cap and the valve plug. The valve may then be lubricated by injection of a suitable lubricant into the valve body through the fitting 35. With the valve so assembled, the initial biasing of the insert bearing into the tapered bore 24 is effected by the spring 14 acting through the balance ring against the flange 63 on the lower end of the bearing. The magnitude of this biasing force depends on the strength of the spring.

In operation, the valve is secured in a conduit with the pipe sections comprising the conduit being threadedly engaged with the threads 21 in the inlet passageway 20 and the threads 23 in the outlet 22. With the valve in open position, as illustrated in FIGURES 1 and 2, all of the various spaces around the valve elements within the valve body will be exposed to line pressure. Since the insert bearing is only lightly biased into the bore 24 by the spring, sufficient leakage will occur around the seal rings 54 and 60 to expose all of the upwardly and downwardly facing surfaces on the insert bearing to line pressure and thus the bearing will be in a state of balance with no pressure from the fluid in the conduit tending to urge it either upwardly or downwardly. Also, with the annular space 131 below the balance ring being connected to the passageway 22 through the ports 112, annular recess 41, and the passageway 34, it will be evident that the annular space below the balance ring is exposed to line pressure. Thus, all of the upwardly and downwardly facing surfaces on the balance ring are so exposed to line pressure and thus there is no tendency for the balance ring to be displaced by the fluid pressure either upwardly or downwardly. It can, therefore, be readily seen that since the pressure in the line does not affect the insert bearing when the bearing is in open position, the only force biasing the insert bearing into the valve body is that exerted by the spring 14.

When the valve is in the closed position, i.e., when the plug 11 is rotated to a position in which the passageway 71 is not in communication with passageways 20 and 22, high pressure will exist in the passageway 20 while there will be low pressure in the outlet passageway 22. The high pressure in the inlet passageway forces the valve plug toward the outlet passageway urging the insert bearing into a more effective sealed relationship with the valve body around the outlet passageway. Considering particularly the view of the valve shown in FIGURE 1, the high pressure being exerted against the left side of the valve plug is urging the valve plug toward the right side of the valve body. With the forces pushing the valve plug to the right, leakage will readily occur around the ring seal 54 and along the surfaces of the insert bearing adajacent to the seal ring allowing line pressure to be exerted in the various spaces around the valve elements within the valve body. For example, line pressure will be readily established within the space above the valve plug around the upper trunnion and also in the annular space 140 below the lower end of the insert bearing and above the inner balance ring seal. Since there are no seals around the flange 63 and the upper end of the balance ring, the pressure on the high pressure side of the line will be exerted on down around the lower trunnion in the bore of the balance ring around the spring 14 and downwardly around the lower end of the balance ring below the outer balance ring seal and as far as the seal 92 around the lower trunnion.

The high pressure of the inlet line will thus be exerted in all of the inner spaces in the valve with the exception, however, of the annular space 131 which is in direct communication with the low pressure or outlet side of the valve through the ports 112, the annular recess 41, and the passageway 34 which connects directly into the outlet passageway 22. While there may be some passage of fluid from below the outer balance ring 125 and from the annular recess 140 past the inner balance ring seal 123, the pressure within the cavity 131 will be so rapidly bled down that effectively the pressure within the annulus 131 around the balance ring will be downstream pressure, and the balance ring is biased downwardly by the pressure acting on the larger area defined by the upper seal 123. Since the vertical projection of the cross-sectional area of the annulus 131 has been designed to have substantially the same area as the area of the ellipse defined by the projection of the center line of the seal ring 60 into a plane perpendicular to the axis of the insert bearing, the pressure conditions establish a condition of balance in the insert bearing which is independent of the absolute value of the pressure within the inlet passageway. The necessity for tightening up on the insert bearing is thus aleviated and high pressures within the valve can be tolerated without appreciably affecting the torque required to turn the valve plug. The forces which bring about this condition of balance are briefly explained as follows. Analyzing the forces on the insert bearing with reference to FIGURE 1, the high pressure within the inlet passage 20 is exposed to an elliptical area as previously discussed defined by a projection of the center line of the seal ring 54. Since the elliptical area is facing upwardly the pressure within the inlet passageway tends to push the insert bearing in a downward direction which, however, is counterbalanced by the same high pressure acting within the annular space 140 below the lower end of the insert bearing against an area equal to the elliptical area tending to urge the insert bearing in an upward direction resulting in a balanced state on the inlet side.

The situation is, however, different on the outlet side of the valve with the elliptical area defined by the projection of the center line of the seal ring 60 exposed to the low pressure within the outlet passageway 22. Since high pressure exists within the annular space 140 it is exerted against the lower end of the insert bearing over an area including an area equal to the elliptical area defined by the seal ring 60. Since a low pressure is being exerted against this area within the outlet passageway and high pressure is being exerted against a comparable area below the lower end of the insert bearing, the net effect is a tendency to urge the insert bearing in an upward direction. Such upward force is, however, counterbalanced by the balance ring. With the exception of those surfaces of the balance ring within the annulus 131 both the upper and lower surfaces of the balance ring are exposed to the high pressure as previously explained. Those downwardly facing surfaces within the annulus 131 are exposed to the low pressure. The upwardly facing surfaces of the balance ring exposed to high pressure exceed the downwardly facing surfaces exposed to high pressure by an amount equal to the elliptical area. The net effect is that an upwardly facing surface, namely the upper face of the inner ring balance ring seal 123, over an effective area equal to the elliptical area is exposed to the high pressure while the equal area within the annulus 131 facing downwardly is exposed to the low pressure with the result that the balance ring is urged downwardly with a force determined by the elliptical area times the difference in the high and low pressures. Thus, the insert bearing is being urged upwardly by a force determined by the elliptical area times the difference in the high and low pressures and the balance ring is being urged downwardly by a force determined by the elliptical area times the difference between the high and low pressures resulting in a balanced state for the insert bearing.

Since the recess 120 in the upper end of the balance ring operatively engages the flange 63 on the lower end of the insert bearing, the upward force on the insert bearing is counterbalanced by the downward force on the balance ring resulting in a zero net force on the insert bearing irrespective of the valves of the high and low pressures. Whether the pressures involved are low or high, the insert bearing is biased into the tapered bore 24 by only the force of the spring 14. The uneven forcing of the bearing into the tapered bore is eliminated. Since the high pressures do not necessitate readjustment of the plug and insert bearing, the torque necessary to rotate the bearing does not change and the valve may be readily employed in an automatic system. Furthermore, the self-adjusting feature of the balance ring makes it unnecessary that the valve be equipped or so located that manual adjustment may be carried out with changes of pressure conditions.

Figure 7:
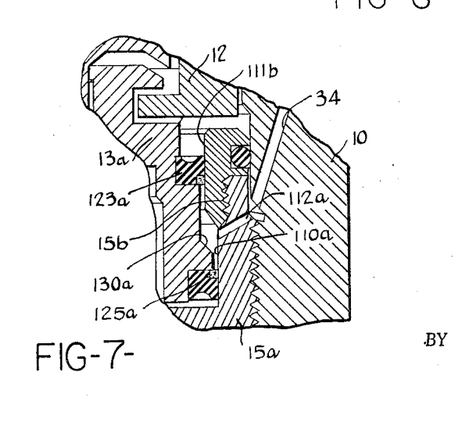
FIGURE 7 is a fragmentary vertical sectional view of the balance ring portion of the valve showing the balance ring having pressure areas arranged to bias the inserts into the tapered bore of the valve body.

The balance ring, balance ring seals, and the balance ring seal seats within the cap have been described as sized so that the balance ring will counterbalance the insert bearing such that there will be no pressure induced inward bias on the insert bearing irrespective of the pressure of the system in which the valve is being used. It may, however, be desired that there be additional biasing assisting or co-acting with the spring, rather than zero biasing, in response to the pressure in the system. If it is desired that the insert bearing be wedged more tightly into the bore of the valve body as the pressure increases, the balance ring assembly may be so designed to bring about such a result. It will be recalled when the valve is closed high pressure acts to urge the balance ring downward over an area equal to the difference in the diameters of the inner and outer balance ring seals. If this area is reduced in size then it will be evident that the balance ring will not be urged downwardly with as much force and therefore the high pressure underneath the insert bearing will push the insert bearing upward into the tapered bore 24 with additional net force. Such a structure is shown in FIGURE 7, wherein the inner balance ring seal 123a has a smaller maximum diameter than that of the outer balance ring seal 125a, the sloping annular face 130a of the balance ring 13a being downwardly and outwardly flared to provide for the difference in diameters of the seals. The annular inward portion of the cap 15a is formed in two sections threaded together at 15b to permit reception of the enlarged outer portion of the balance ring 13a into the enlarged bore of the cap forming the outer balance ring seal seat 110a, while the inner section of the annular inward portion of the cap provides the inner balance ring seal seat 111b having a smaller diameter than the outer ring seal seat 110a. It will be seen therefore that the outer diameters of the inner and outer balance ring seals may be varied and that the inward bias increases as the diameter of the outer balance ring seal increases and as the diameter of the inner balance ring seal decreases.

It will thus be seen from the foregoing that there has been illustrated and described, a new and improved form of plug valve having an automatically adjusting tapered insert bearing.

It will further be seen that the valve may be adjusted at time of construction so that it may be operated over an extended period of time without manual adjustment thereby permitting it to be employed in both automatic systems where minimum torque operation is desirable and also in remote locations where adjustment is impractical.

It will be further seen that the valve utilizes a tapered bearing and seal insert and pressure balancing means therefor which allows operation under low torque conditions.

It will be additionally seen that the valve has self-adjusting features which are responsive to the pressures within the line.

It will also be seen that the valve utilizes a balance ring which is operatively associated with the insert bearing to maintain the desired thrust condition on the insert bearing.

It will be additionally recognized that the valve utilizes a combination of both spring and hydrostatic forces with respect to the biasing of its tapered insert bearing.

It will also be seen that the valve employs a tapered insert bearing which is constructed of substantially corrosion resistant low frictional material.

It will be evident that the balance ring exerts a force on the insert bearing equal and opposite to the uneven force due to the taper of the bearing urging the bearing into the tapered bore when a pressure differential is exerted across the valve.

It will be further seen that additional torque required to rotate the valve due to uneven forcing of the bearing into the tapered bore is thus eliminated.

Figure 6:
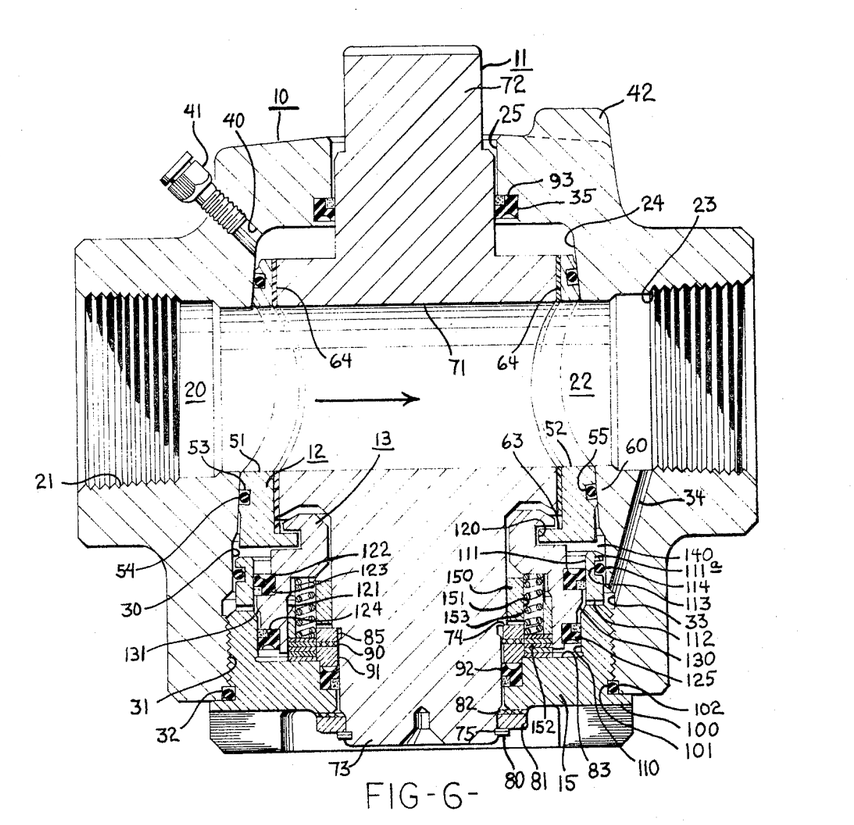
FIGURE 6 is a vertical cross-section of an alternative embodiment of the valve of the invention.

An alternative embodiment of a valve constructed in accordance with the invention is illustrated in FIGURE 6, which shows apparatus for readily changing the spring biasing force upon the insert bearing. The valve shown in FIGURE 6 is identical to the valve of FIGURES 1–5 in all respect both in elements and in function with the exception, however, that the spring 14 as shown in FIGURE 1 is replaced by a spring assembly which lends itself to ready adjustment to attain a particular desired biasing force on the insert bearing. Therefore, identical reference numerals are used on those parts of the valve illustrated in FIGURE 6 which are identical to the valve of FIGURE 1. Also, the description of all identical parts will not be repeated but rather the hereinabove description of the valve of FIGURE 1 will be relied upon.

Referring to FIGURE 6, positioned within the bore 121 of the balance ring is a spring cage 150 which is provided with a plurality of radially positioned, longitudinally extending, cylindrical bores 151 entirely around the spring cage. The bore of the spring cage fits snugly around the lower trunnion on the valve plug. Located between the inner face 83 of the cap and the spring cage are a plurality of washers 152. Positioned within the bores 151 of the spring cage are the springs 153 which are held in alignment by the spring cage and are confined with their outward ends resting against the innermost of the washers 152 and their inward ends in contact with the back face of the balance ring within the bore 121 of the ring. The spring assembly, including the spring cage, the washers, and the springs are held in position by the inner thrust ring 85, the thrust washer 90 and the thrust back-up ring 91 which also perform the previously described function of preventing outward movement of the valve plug. When the valve is assembled in the previously described manner, the number of springs placed within the spring cage determines the constant bias placed against the insert bearing. The force biasing the insert bearing inwardly due to the spring action is directly proportional to the number of springs placed within the spring cage when the valve is assembled. The total number of springs employed is a space dependent function determined according to the number of cylindrical bores which can be placed in the available space around the spring cage. Obviously, any number less than the maximum number of springs may be used to vary the force exerted by spring action against the insert bearing. If less than the total number of bores in the spring cage are filled with springs, the springs should be evenly distributed around the cage. While the changing of the number of springs within the cage is not a procedure which is easily and quickly carried out, the provision of means for varying the number does permit appreciable latitude in establishing the characteristics of the valve at the time the valve is assembled and further allows the valve to be disassembled and additional springs added should such be necessary. The use of the alternative arrangement of spring biasing shown in FIGURE 6 obviates the necessity of having a number of springs 14 with different characteristics in order to obtain flexibility in the operating conditions under which valves constructed in accordance with the invention may be used. It will be clear that since the embodiment shown in FIGURE 6 differs from that of FIGURES 1–5 only in that such embodiment employs the spring cage, the springs and the washers shown, the valve may be converted at any time to the embodiment illustrated in FIGURE 1 by simple substitution of the single spring 14. The operation of the valve illustrated in FIGURE 6 is identical to the operation of the valve of FIGURE 1 as previously described.

It will be evident that there has been further described and illustrated a cylindrical plug type valve having a tapered insert which utilizes a pressure actuated balance ring to adapt the valve to automatic operation under all pressure conditions and allows variation of the spring biasing force provided with the valve. It will be further evident that the valve includes a spring assembly in which the number of springs employed for biasing the insert bearing may be varied in accordance with the characteristics desired in the valve.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A plug valve comprising in combination: a valve body provided with an inlet passageway and an outlet passageway, said body being further provided with a tapered bore having an axis running substantially transverse to the axis of said inlet and outlet passageways; tapered seal and bearing insert means positioned within said tapered bore in said body, the outer surface of said insert means conforming to the surface of said tapered bore, said insert means having a cylindrical bore extending therethrough; a cylindrical valve plug rotatably positioned within said insert means; said insert means engaging and sealing between said cylindrical plug and the tapered bore of the body of said valve, said insert means and said valve plug having pasageways therethrough to cooperate with the passageways through said valve body for controlling fluid flow through said valve; resilient means for biasing said insert bearing inwardly into said tapered bore in said valve body; and pressure balance means in said transverse bore of said valve body operatively connected with said inlet means acting to counteract the effect of fluid presure within said transverse bore tending to move said insert means in said tapered bore in a direction wedging between the plug and valve body.

2. A plug valve comprising in combination: a valve body provided with an inlet passageway and an outlet passageway, said body being further provided with a tapered bore having an axis running substantially transverse to the axis of said inlet and outlet passageways; a tapered bearing and seal insert positioned within said tapered bore in said body, the outer surface of said insert bearing conforming to the surface of said tapered bore, said insert bearing having a cylindrical bore extending therethrough; a cylindrical valve plug rotatably positioned within said insert; said insert and said valve plug having passageways therethrough to cooperate with the passageways through said valve body for controlling fluid flow through said valve; spring means operatively associated with said insert and said valve body for biasing said insert inwardly into said tapered bore in said valve body; seal means on said insert surrounding each of the passageways therethrough and engageable with the tapered bore of the valve body to seal therebetween, said seal means providing a sealed off area subject to fluid pressure within the tapered bore of the body biasing the insert into said tapered bore in response to such fluid pressure; and a balance ring operatively engaged with said insert and having an area thereon opposed to the area defined by the seal means on the insert responsive to the pressure in the tapered bore of said valve body to counteract the effect of the fluid pressure in said tapered bore tending to force the insert inwardly of the tapered bore, whereby the insert is biased into sealing and supporting engagement with the plug and the tapered bore of the body in response to the force of the spring means acting thereon.

3. A plug valve of the character set forth in claim 2, wherein said spring means includes a plurality of coil springs positioned at radially spaced points around the balance ring and confined between the balance ring and the valve body, each of said springs being oriented to exert a force biasing the balance ring toward the insert means, whereby the insert means is biased into the tapered bore of the valve body by such springs means.

4. A plug valve of the character set forth in claim 2, wherein said spring means comprises a helical coiled spring confined between the balance ring and the valve body and oriented to exert a force on the balance ring biasing said balance ring inwardly of the tapered bore of said body, whereby the insert means is biased inwardly of said tapered bore in accordance with the force exerted by said spring means.

5. A plug valve comprising in combination: a valve body provided with an inlet passageway and an outlet passageway, said body being further provided with a tapered bore having an axis running substantially transverse to the axis of said inlet and outlet passageways; a pair of tapered bearing and seal insert means positioned within said tapered bore in said body, the outer surface of said insert means conforming to the surface of said tapered bore, said insert means having a cylindrical bore extending therethrough; a cylindrical valve plug rotatably positioned within said insert means; each of said insert means and said valve plug having passageways therethrough to cooperate with the passageways through said valve body for controlling fluid flow through said valve; spring means operatively associated with said insert means and said valve body for biasing said insert means inwardly into said tapered bore in said valve body; seal means on the exterior of each of said insert means surrounding the passageway therein and engaging the tapered bore of the valve body for sealing therewith, said seal rings defining an area subjected to fluid pressure within the tapered bore of the body tending to urge the insert means inwardly into said tapered bore; and a balance ring operatively associated with the outward end of said insert means for counteracting the fluid pressure force on said insert means in accordance with the presure in said valve, said balance ring having opposed surfaces exposed to the pressure within the bore of the valve body and providing a presure responsive area opposed to the area defined by the seal ring on each of the insert means for counteracting the effect of fluid pressure within the bore of the valve body acting on said area of such insert means.

6. A plug valve of the character set forth in claim 5, wherein said spring means comprises a plurality of coil springs positioned at radially spaced points around the balance ring and confined between the balance ring and the valve body and oriented to exert a force on the balance ring biasing the balance ring inwardly of the tapered bore of the body to bias the insert means inwardly of said tapered bore, said coil springs providing means for varying the resilient force acting on said insert means.

7. A plug valve of the character set forth in claim 5, wherein the cylindrical valve plug is provided with trunnion means at the opposite ends of and coaxial with said cylindrical plug means and rotatably engaged with the valve body for supporting said plug means in the valve body; and said spring means comprises a helical coiled spring confined between the body and the balance ring and surrounding one of the trunnions of the cylindrical plug, said spring biasing said balance ring inwardly of said tapered bore of the valve body to bias the insert means inwardly of said bore into engagement with the plug means and tapered bore of the valve body for sealing therebetween.

8. A plug valve of the character set forth in claim 4, wherein said balance ring is formed with one surface exposed to the pressure within the inlet side of said valve tending to urge said balance ring away from said insert means, said balance ring having another opposing surface exposed to the pressure in the outlet passageway of said valve tending to urge said balance ring toward said insert means.

9. A plug valve comprising in combination: a valve body provided with an inlet passageway and an outlet passageway, said body being further provided with a tapered bore having an axis running substantially transverse to the axis of said inlet and outlet passageways; tapered bearing and seal insert means positioned within said tapered bore in said body, the outer surface of said insert means conforming to the surface of said tapered bore, said insert means having a cylindrical bore extending therethrough; a cylindrical valve plug rotatably positioned within said insert means; said insert means and said valve plug having passageways therethrough to cooperate with the passageways through said valve body for controlling fluid flow through said valve; spring means operatively associated with said insert means and said valve body for biasing said insert means inwardly into said tapered bore in said valve body; seal means on said insert means surrounding each of said passageways therein and engaging the tapered bore of the valve body for sealing therebetween, said seal means defining an area at each passageway responsive to fluid pressure within the tapered bore of the valve body tending to urge the insert means further into said tapered bore; and a balance ring assembly operatively associated with the outer end of said insert means for automatically controlling the effect of the pressure within said valve body acting on the area sealed off by the seal means on the insert means at the outlet passageway of said valve body, said balance ring assembly having first surfaces exposed to the high pressure within the inlet side of said valve tending to urge said balance ring away from said insert means, said balance ring assembly having second surfaces opposing said first surfaces, said second surfaces being exposed to the pressure in the outlet side of said valve, the areas of said surfaces being predetermined to provide an area opposed to the area defined by the seal means on each of the insert means and responsive to fluid pressure within the valve body for counteracting the effect of the fluid pressure acting on such area defined by the seal means of the insert means to control the force acting on the insert means tending to move said insert means into the tapered bore of the valve body.

10. A plug valve according to claim 9 wherein the areas of the first and second surfaces on said balance ring assembly are such that the biasing effect of the pressure within said valve body upon said insert means will be neutralized by such pressure responsive differential area of said balance ring.

11. A plug valve comprising in combination: a valve body having an inlet passageway and an outlet passageway, said passageways having a common axis, said body also having a tapered bore with an axis transverse to the axis of said inlet and outlet passageways; a tapered bearing and seal insert having an outer conical surface conforming to the surface of the tapered bore within the valve body, said insert being provided with a cylindrical internal bore, said insert being also provided with cylindrical ports in opposite sides thereof, said cylindrical ports being of a size and so positioned to register with the inlet and outlet passageways through said valve body; said valve body and said insert having means restraining said insert in a position with the ports therein aligned with the passageways of the valve body; said insert being provided with a seal ring around the port on each side of said insert for effecting a sealing relationship between said insert and said tapered bore in said valve body around each of said ports in said insert; a cylindrical valve plug having trunnions on opposite ends, said cylindrical plug being positioned within said insert, said valve plug having a flow passage therethrough transverse to the axis of said plug, said flow passage conforming to the ports in said insert when said plug is in open position; a balance ring assembly including a balance ring, an inner balance ring seal disposed at the end of said ring assembly adjacent said insert, and an outer balance ring seal disposed on the opposite end of said balance ring assembly from said insert, said balance ring assembly being operatively associated with said insert for providing a pressure induced bias on said insert urging said insert outwardly of said tapered bore of said valve body in accordance with the pressure within said valve, the outside diameter of said inner balance ring seal being greater than the outside diameter of said outer balance ring seal, the difference in said diameters defining the net surface exposed to the inlet passageway pressure tending to urge said balance ring outwardly from said tapered bore, said balance ring also having an annular downwardly facing surface between said inner and outer ring seals; means providing a conduit for fluid pressure from the outlet passageway of the valve body to the tapered bore of the body between the balance ring seals, whereby said downwardly facing surface between the seal rings of said balance ring is exposed to the pressure in the outlet passageway of said valve to cause said pressure to urge said balance ring inwardly of said tapered bore, the differences between the opposed surfaces of said balance ring providing an area exposed to the difference in pressure between the pressure in the bore of the body and the pressure in the outlet passageway acting on the balance ring with a force tending to move the insert outwardly of said tapered bore; said area of said insert sealed off by the seal ring surrounding the port of the insert at the outlet passageway defining an area subject to fluid pressure within the tapered bore of the valve tending to bias said insert inwardly of said tapered bore; said differential area of said balance ring substantially counteracting the force of the fluid pressure within the tapered bore of the body acting on the insert whereby the insert is substantially unaffected by the pressure within the tapered bore of the valve body; and spring means operatively associated with said balance ring and said valve body for biasing said balance ring inwardly of said tapered bore of said body to urge said insert inwardly of said tapered bore into engagement with the cylindrical plug and the tapered bore adjacent the outlet passageway from the body, whereby the frictional force between the plug and the insert is substantially controlled by the biasing force of the spring means, and the torque required to turn the plug from closed to open positions is minimized.

12. A plug valve in accordance with claim 11 wherein the cylindrical valve plug is provided with trunnion means at the opposite ends of and coaxial with said cylindrical plug means and rotatably engaged with the valve body for supporting said plug means in the valve body; and said spring means includes an annular spring cage having a plurality of spaced apart bores oriented with their axes parallel to the axis of said cage, said cage being positioned around the one of said trunnions, and a coil spring positioned in each of said bores in said cage for exerting a force between said balance ring and said valve body to bias said balance ring inwardly toward said tapered bore.

13. In a rotary plug valve having a body provided with a transverse flow passage having an inlet and an outlet and intersected by a tapered seat surface, tapered bearing and seal insert means surrounding a cylindrical transversely ported plug rotatable in the insert means, said insert means being held against rotation with respect to the valve body, and being ported to coact with said ported plug to control flow through the flow passage of the body, the combination comprising: seal means on said insert means surrounding said ports therein and sealing between said insert means and the tapered seat surface of the valve body; means biasing said insert means along said tapered seat surface of the body toward increased sealing engagement between said plug and said tapered seat surface of said valve body; and means in said body providing pressure responsive area opposed to the area of said insert means sealed off by said seal means around said port to counteract the effect of fluid pressure within the housing tending to move the insert means into tighter engagement between the plug and the tapered seat surface of the body so as to reduce the torque required to turn the plug in the body.

14. A plug valve of the character set forth in claim 11, wherein the cylindrical valve plug is provided with trunnion means at the opposite ends of and coaxial with said cylindrical plug and rotatably engaged with the valve body for supporting said plug means in the valve body; and said spring means comprises a helical coiled spring confined between the valve body and the balance ring and surrounding one of the trunnions of the cylindrical plug, said spring biasing said balance ring inwardly of said tapered bore of the valve body to bias the insert means inwardly of said bore into engagement with the plug and tapered bore of the valve body for sealing therebetween.

15. A plug valve of a character set forth in claim 11, wherein the cylindrical valve plug is provided with trunnion means at the opposite ends of and coaxial with said cylindrical plug and rotatably engaged with the valve body for supporting said plug means in the valve body; and said spring means comprises a plurality of coil springs disposed in position at radially spaced positions around one of said trunnions and confined between the balance ring and the valve body, said coil springs biasing said balance ring inwardly of said tapered bore of the valve body to bias said insert means inwardly of said bore into engagement with the plug means and tapered bore of the valve body.

16. A plug valve of the character set forth in claim 11, wherein said spring means includes a plurality of coil springs positioned at radially spaced points around the balance ring and confined between the balance ring and the valve body, each of said springs being oriented to exert a force biasing the balance ring toward the insert means, whereby the insert means is biased into the tapered bore of the valve body by such spring means.

17. A plug valve of the character set forth in claim 11, wherein said spring means comprises a plurality of coil springs positioned at radially spaced points around the balance ring and confined between the balance ring and the valve body and oriented to exert a force on the balance ring biasing the balance ring inwardly of the tapered bore of the body to bias the insert means inwardly of said tapered bore, said coil springs providing means for varying the resilient force acting on said insert means.

18. A plug valve of the character set forth in claim 11, wherein said spring means comprises a helical coiled spring confined between the balance ring and the valve body and oriented to exert a force on the balance ring biasing said balance ring inwardly of the tapered bore of said body, whereby the insert means is biased inwardly of said tapered bore in accordance with the force exerted by said spring means.

References Cited

UNITED STATES PATENTS

| | | | |
|---|---|---|---|
| 2,767,729 | 10/1956 | Mueller | 251—283 XR |
| 2,954,961 | 10/1960 | Stogner | 251—316 XR |
| 3,109,623 | 11/1963 | Bryant | 25—172 |
| 3,112,064 | 11/1963 | Ayling | 137—454.4 XR |
| 3,133,722 | 5/1964 | McGuire | 251—309 |
| 3,179,121 | 4/1965 | Bredtschneider | 251—170 XR |

HAROLD W. WEAKLEY, Primary Examiner

U.S. Cl. X.R.

251—283, 316, 336